Feb. 17, 1931. W. J. IRWIN 1,792,537
COWL FASTENER
Filed Oct. 28, 1927
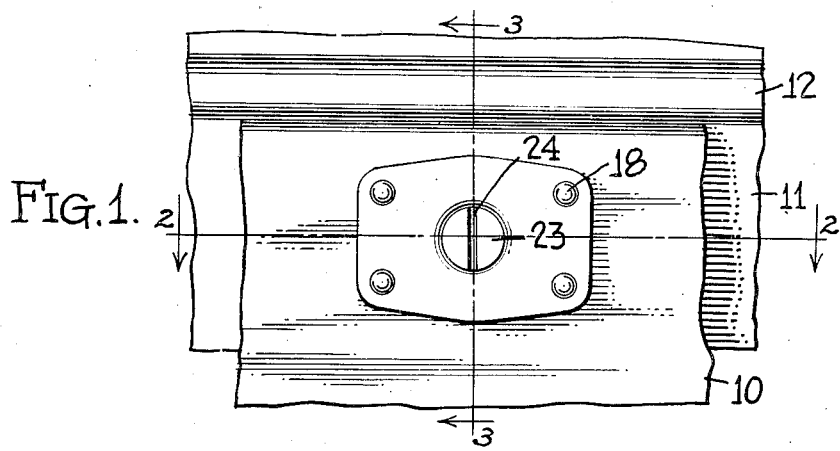
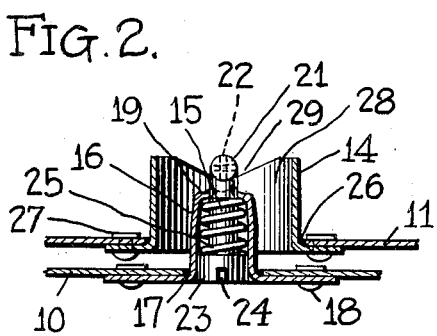
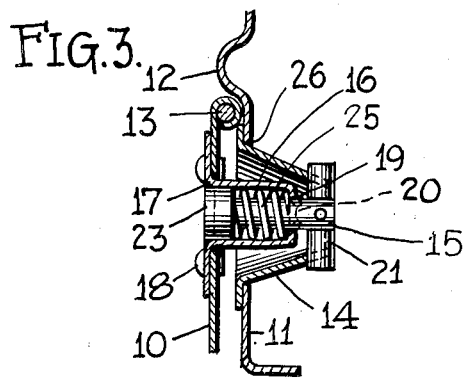
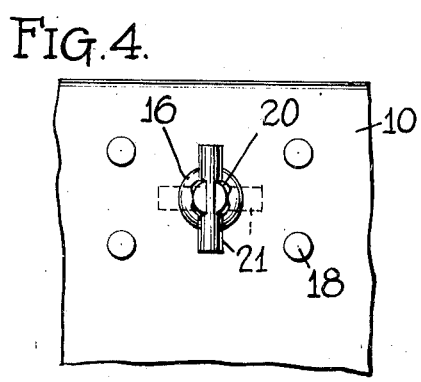
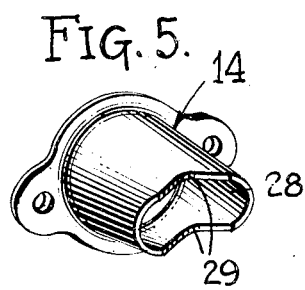
INVENTOR.
WILLIAM J. IRWIN.
BY
ATTORNEYS.

Patented Feb. 17, 1931

1,792,537

UNITED STATES PATENT OFFICE

WILLIAM J. IRWIN, OF HEMPSTEAD, NEW YORK, ASSIGNOR TO CURTISS AEROPLANE & MOTOR COMPANY, INC., A CORPORATION OF NEW YORK

COWL FASTENER

Application filed October 28, 1927. Serial No. 229,418.

My invention relates to hood or cowl fasteners.

In an aeroplane, for instance, it is customary to cowl-in or enclose the motor or power plant with one or more separately removable cowling pieces or cowls. These cowling pieces or cowls are usually fastened directly to each other or to the aeroplane fuselage by suitable hood or cowl fasteners of one or another form. That form of cowl fastener most commonly used comprises a removable wire rod or the like laced alternately thru eyes or the like formed in or on the attached cowls or in or on the cowl and the fuselage to which said cowl is fastened. Such a cowl fastener, while strong, neat and serviceable from many angles is nevertheless extremely objectionable in that great difficulty is often encountered in lacing and unlacing the wire rod.

The present invention, as distinguished from the above, contemplates a hood or cowl fastener in which a retaining device or element is locked and unlocked, and the cowl accordingly fastened and unfastened, by an extremely simple and quickly accomplished operation. Preferably the fastener comprises a rotatably adjustable plunger so mounted and related to a receiving socket or the like as to admit of the fastening and unfastening of the cowl by an adjustment of said plunger; said plunger being carried by the removable cowl piece and said socket being carried by that part or portion of the aeroplane or other structure to which said cowl is fastened. To eliminate head resistance the fastener in its entirety is countersunk in its relation to the exterior or outer surface of the cowl.

In the drawings: Fig. 1 is a side elevation of the cowl fastener;

Fig. 2 is a section on the line 2—2 of Fig. 1;

Fig. 3 is a section on the line 3—3 of Fig. 1;

Fig. 4 is a face view, looking from the inside of that portion of the fastener of which the plunger forms a part, and Fig. 5 is a perspective view of the socket.

In the embodiment of the invention selected for illustration a removable cowl piece 10 is shown attached to a strip 11 forming a part or portion of the fuselage frame. This strip 11 has formed thereon a head or corrugation 12 against which the cowl piece 10 is fitted. Said cowl piece 10 is reinforced along its edge as at 13 and may be hinged in place or made entirely removable as desired. Along one or more of its edges said cowl piece is provided with one or more fasteners; the number of fasteners depending of course upon the size of the particular cowl.

Each cowl fastener preferably comprises a receiving socket 14 and a plunger 15. The plunger 15 is carried by and partially enclosed within a casing 16 either formed integrally with or passed thru an opening 17 formed in the cowl piece 10 and riveted thereto as at 18. Said casing 16 is of substantially uniform inside diameter throughout and has formed therein, at its inner end, an opening 19 thru which the plunger 15 extends. Around said opening 19 spaced ears or lips 20 are formed on the casing 16.

The plunger 15, throughout the greater portion of its length, is of substantially uniform diameter. At its inner end it is provided with a cross-head 21 pinned thereto as at 22, and at its outer end it is provided with a head portion 23 having formed therein a cross-cut or kerf 24. Said head portion 23, which is circular in cross-section, fits loosely within the casing 16, and in the locked or fastened position of the plunger lies flush with the outer surface of the cowl piece 10. By fitting a screw-driver or other similar tool within the cross-cut 24, the plunger 15 can be pressed inwardly and rotatably adjusted to vary the position of the cross-head 21. A spring 25 enclosed within said casing, and bearing at its opposite ends on the inner casing end and on the head portion 23 respectively, acts to urge said plunger in an outward direction. The cross-head 21 of the plunger is accordingly forced toward and into bearing engagement with either the inner socket end or the inner casing end, depending upon its position of adjustment.

The receiving socket 14 is formed either integrally with or passed thru an opening 26 formed in the strip 11 and fastened thereto as at 27. In cross-section it is large enough to receive therein the casing 16. The depth to which the socket 14 is carried inwardly is directly proportional to the length of plunger used. In Fig. 5 it will be noted that the side walls of the socket 16 are flattened to provide at the inner socket end an elongated opening 28. In one position of adjustment of the plunger 15 the cross-head 21 thereof can be passed freely thru said opening, such passage being essential to the fastening and unfastening of the cowl. In a different position of adjustment, however, said cross-head, if forced thru said opening and turned, cannot pass back again therethru; such return movement of the plunger being prevented by the engagement of the cross-head with the flattened side walls of the socket 14. The cross-head, when thus engaged, constitutes a positive fastening for the cowl. To guide said cross-head into the desired fastened or locked position, cam surfaces 29 are formed on the inner socket end. These surfaces 29, on the one hand, and the ears or lips 20 on the other, serve as a means for holding and positioning the plunger in the desired adjusted position whether or not the cowl piece 10 is fastened or unfastened.

A cowl fastener characterized as above set forth is inexpensive to manufacture, simple in operation, and positive as a fastening means. With the aid of a screw-driver or other similar tool the plunger 15 can be forced inwardly against the urge of the spring 25 and turned. The operation is the same whether or not it is desired to fasten or unfasten the cowl. The moment the pressure on the plunger is relieved, the spring 25 acts automatically to re-seat the cross-head either against the socket 24 or against the inner end of the casing 16. In the former position of adjustment the cowl piece is firmly fastened and in the latter position of adjustment it is completely released. No lining-up or other troublesome work is required to be performed to either fasten or unfasten the cowl.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a cowl fastener, a rotatably adjustable plunger, a cross-head formed on the inner end of said plunger, a tubular open end casing fastened to said cowl, a tubular open end socket fastened to that part of the structure to which said cowl is fastened, said socket and said casing being so relatively dimensioned as to admit of the fitting engagement of the one within the other, and said cross-head, in one position of adjustment, being adapted to overhang and bear on the inner end edge of said socket to securely fasten said cowl, cam surfaces formed on the inner end edge of said socket for guiding said cross-head toward that position of adjustment in which said cowl is fastened, cam surfaces formed on the inner end edge of said casing for holding said cross-head, when said cowl is released, in that position of adjustment admitting of its passage thru the inner open end of said socket, and means within said casing and bearing on said plunger to yieldingly hold said cross-head in either position of adjustment.

2. In a cowl fastener, a rotatably adjustable plunger, a cross-head formed on the inner end of said plunger, a tubular open end casing fastened to and projecting inwardly beyond the inner face of said cowl, a tubular open end socket fastened to and projecting inwardly beyond that part of the structure to which said cowl is fastened, said socket and said casing being so relatively dimensioned as to admit of the fitting engagement of the one within the other in the fastened position of the cowl, and said socket at its inner end being so shaped in cross-section as to provide at said inner end an elongated opening thru which said cross-head, in one position of adjustment is free to pass, and against the inner end edge of which said cross-head, in a different position of adjustment is adapted to overhang and bear, cam surfaces formed on the inner end edge of said socket for guiding said cross-head toward that position of adjustment in which the cross-head is held against passage thru said opening, cam surfaces formed on the inner end edge of said casing for holding said cross-head, when withdrawn thru said opening, in that position of adjustment admitting of its passage thru said opening, and means within said casing and bearing on said plunger to yieldingly hold said cross-head against said socket edge and the outer plunger end substantially flush with the outer face of the cowl.

3. In a cowl fastener, a rotatably adjustable plunger, a cross-head formed on the inner end of said plunger, a tubular open end casing fastened to and projecting inwardly beyond the inner face of said cowl, a tubular open end socket fastened to and projecting inwardly beyond that part of the structure to which said cowl is fastened, said socket and said casing being so relatively dimensioned as to admit of the fitting engagement of the one within the other in the fastened position of the cowl, and said socket at its inner end being so shaped in cross-section as to provide at said inner end an elongated opening thru which said cross-head, in one position of adjustment, is free to pass, and against the inner end edge of which said cross-head, in a different position of adjustment, is adapted to overhang and bear, said cross-head, when withdrawn thru said opening being adapted to bear on said casing at its inner end, and means within said casing and bearing on said plunger to yieldingly hold said cross-head in either said position of adjustment, said plunger, when said cross-head is held against said socket edge, terminating at its outer end substantially flush with the outer face of the cowl.

4. In a fastener for a cowl for aircraft, a tubular open end casing fastened to and projecting inwardly beyond the inner face of said cowl, a relatively adjustable plunger positioned in said casing, a substantially perpendicular projection formed on the inner end of said plunger, a structure to which said cowl may be fastened and against the edge of which said perpendicular projection is adapted at times to overhang and bear, and means within said casing and bearing on said plunger to yieldingly hold said perpendicular projection against said structure, said plunger when said perpendicular projection is held against said structure, terminating at its outer end substantially flush with the outer face of the cowl.

5. In a fastener for a cowl for aircraft, a tubular open end casing fastened to and projecting inwardly beyond the inner face of said cowl, a relatively adjustable plunger positioned in said casing, a substantially perpendicular projection formed on the inner end of said plunger, a structure to which said cowl may be fastened and against the edge of which said perpendicular projection is adapted at times to overhang and bear, said plunger having formed in the outer end thereof a screw slot for the insertion of a suitable implement to turn said plunger, and means comprising a spring positioned within said casing and bearing on said plunger for yieldingly holding said perpendicular projection against said structure, said plunger when said perpendicular projection is held against said structure, terminating at its outer end substantially flush with the outer face of the cowl.

6. In a fastener for a cowl for aircraft, a tubular open end casing fastened to and projecting inward beyond the inner face of said cowl, a relatively adjustable plunger positioned in said casing, a substantially perpendicular projection on the inner end of said plunger, a structure to which said cowl may be fastened, having an elongated opening through which the said projection in one position of adjustment is free to pass and against the inner edge of which said perpendicular projection in a different position of adjustment is adapted to overhang and bear, said cross head when withdrawn through said opening being adapted to bear on said casing at its inner end, and means within said casing and bearing on said plunger for yieldingly holding said perpendicular projection in either of said positions of adjustment, said plunger when said perpendicular projection is held against said opening terminating at its outer end substantially flush with the outer face of the cowl.

7. In a fastener for a cowl for aircraft, a tubular open end casing fastened to and projecting inwardly beyond the inner face of said cowl, a relatively adjustable plunger positioned in said casing, a spring surrounding said plunger and bearing at one end against the plunger and at the opposite end against the casing for yieldingly holding said plunger outward in said casing, a cross head formed on the inner end of said plunger, a structure to which said cowl may be fastened and against which said cross head is adapted at times to bear, said plunger having a screw slot formed in the outer end thereof by which a suitable implement may be used to rotate said plunger.

8. In a fastener for a cowl for aircraft, a tubular open end casing fastened to and projecting inwardly beyond the inner face of said cowl, a relatively adjustable plunger positioned in said casing, a spring surrounding said plunger and bearing at one end against the plunger and at the opposite end against the casing for yieldingly holding said plunger outward in said casing, a cross head formed on the inner end of said plunger, a structure to which said cowl may be fastened and against which said cross head is adapted at times to bear, said plunger having a screw slot formed in the outer end thereof by which a suitable implement may be used to rotate said plunger, and said casing having a depression formed therein and into which a part of said cross head is adapted to be forced at times by said spring to position said cross head.

In testimony whereof I hereunto affix my signature.

WILLIAM J. IRWIN.